(12) United States Patent
Sato et al.

(10) Patent No.: US 8,272,616 B2
(45) Date of Patent: Sep. 25, 2012

(54) ROTATION MECHANISM FOR LASER EMITTER

(75) Inventors: Kazuo Sato, Tokyo (JP); Wataru Iwasaki, Tokyo (JP); Koichiro Mano, Tokyo (JP)

(73) Assignee: TJM Design Corporation, Tokyo (JP)

( * ) Notice: Subject to any disclaimer, the term of this patent is extended or adjusted under 35 U.S.C. 154(b) by 709 days.

(21) Appl. No.: 12/375,947

(22) PCT Filed: Aug. 4, 2006

(86) PCT No.: PCT/JP2006/315501
§ 371 (c)(1),
(2), (4) Date: Apr. 23, 2009

(87) PCT Pub. No.: WO2008/015760
PCT Pub. Date: Feb. 7, 2008

(65) Prior Publication Data
US 2010/0001162 A1   Jan. 7, 2010

(51) Int. Cl.
*A47B 91/00* (2006.01)
(52) U.S. Cl. .................. 248/349.1; 248/186.2
(58) Field of Classification Search .......... 248/415, 248/349.1, 324, 274.1, 289.11, 282.1, 292.12, 248/292.13, 652, 664, 917, 918, 186.1, 186.2; 359/236, 211.5; 356/141.1
See application file for complete search history.

(56) References Cited

U.S. PATENT DOCUMENTS

| | | | | |
|---|---|---|---|---|
| 4,519,705 A | * | 5/1985 | Morrow | 356/138 |
| 5,485,266 A | * | 1/1996 | Hirano et al. | 356/249 |
| 5,621,975 A | * | 4/1997 | Rando | 33/227 |
| 5,754,582 A | * | 5/1998 | Dong | 372/107 |
| 5,852,493 A | * | 12/1998 | Monnin | 356/141.1 |
| 6,688,011 B2 | * | 2/2004 | Gamal et al. | 33/290 |
| 6,931,739 B2 | * | 8/2005 | Chang et al. | 33/286 |

FOREIGN PATENT DOCUMENTS

| | | |
|---|---|---|
| JP | 9166436 | 6/1997 |
| JP | 2000230828 | 8/2000 |
| JP | 2001191271 | 7/2001 |
| JP | 2006125992 A * | 5/2006 |
| JP | 2008128645 A * | 6/2008 |

* cited by examiner

*Primary Examiner* — Terrell McKinnon
*Assistant Examiner* — Eret McNichols
(74) *Attorney, Agent, or Firm* — Fish & Richardson P.C.

(57) ABSTRACT

A rotation mechanism for mounting and rotatably supporting a laser emitter thereon includes a casing including a bottom wall and a side wall connected to the bottom wall, said casing defining therein a receiving space. A plurality of rotation rings are arranged as being layered with each other in the receiving space of the casing. The rotation rings include an uppermost rotation ring in the form of a manual coarse rotation ring that is directly connected to the laser emitter so as to support the laser emitter, for manually rotating the laser emitter to achieve a coarse angular positioning thereof, an automatic coarse rotation ring for rotating the laser emitter at a relatively high speed together with the rotation ring thereon, a manual fine rotation ring for slightly rotating the laser emitter manually together with the rotation ring thereon, and an automatic fine rotation ring for rotating the laser emitter at a relatively low speed, together with the rotation ring thereon. The automatic rotation rings are each provided with a driving means that is arranged on the rotation ring immediately below the relevant rotation ring.

9 Claims, 11 Drawing Sheets

(a)

(b)

ROTATION MECHANISM FOR LASER EMITTER

TECHNICAL FIELD

The present invention relates to a rotation mechanism for a laser emitter, which can be suitably used for marking purpose in construction or civil engineering sites, and which is designed to rapidly and accurately rotate the laser emitter to a position corresponding to the direction in which laser is to be emitted.

BACKGROUND ART

There is known a laser emitter for emitting and displaying a laser line on a surface of a wall, ceiling or floor, which includes a rotation mechanism incorporated into the lower end region of the emitter main body, such that the laser line generated can be radiated over an angular range of 360°. In this instance, when the laser emitter has been installed, the marking is performed after manually operating the rotation mechanism so as to cause a coarse rotation of the emitter main body, by accurately aligning the laser line to the target site by a fine adjusting movement (cf. Patent Document 1: JP9-166436A).

This type of laser emitter requires an extremely delicate and precise adjustment when the laser line is to be manually focused to the target site by an operator, in particular when the laser line is generated so as to form a vertical line. Such an adjustment is a heavy burden to the operator. It is needless to say that the adjustment becomes less easy when the distance between the laser emitter and the light receiving element increases, even when a fine adjustment mechanism is provided.

In order to overcome such a problem, there is also known a laser emitter that can be rotated by a remote control and stopped when the laser line emitted from the laser emitter is detected by a light receiving element that has been previously arranged at the target site (cf. Patent Document 2: JP2000-230828A, and Patent Document 3: JP2001-191271A).

While the laser emitter of remote control type as mentioned above allows simplification of the manual operation and proved to be an effective measure for reducing the time required for marking, there is such disadvantage that the system becomes large due to the requirement for a driving source for the laser emitter.

Besides, while a coarse positioning adjustment is generally performed by manually rotating the emitter main body, particularly in the case of the laser emitter of remote control type, the driving system tends to be subjected to an excessive load when the emitter main body is manually rotated, which may cause mechanical failures.

DISCLOSURE OF THE INVENTION

Task to be Solved by the Invention

It is an object of the present invention to provide a rotation mechanism, which allows a rapid and accurate focusing of the laser line emitted from the laser emitter, which is not subjected to an excessive load that may lead to mechanical failures, even when rotated manually, and which is compact in structure.

Means for Solving the Task

According to the present invention, there is provided a rotation mechanism for mounting and rotatably supporting a laser emitter thereon, said rotary mechanism comprising:

a casing including a bottom wall and a side wall connected to the bottom wall, said casing defining therein a receiving space; and a plurality of rotary rings that are arranged as being layered with each other in the receiving space of the casing;

said plurality of rotation rings comprising: an uppermost rotary ring in the form of a manual coarse rotation ring that is directly connected to the laser emitter so as to support the laser emitter, for manually rotating the laser emitter to achieve a coarse angular positioning thereof; an automatic coarse rotation ring for rotating the laser emitter at a relatively high speed together with the rotation ring thereon; a manual line rotation ring for slightly rotating the laser emitter manually together with the rotation ring thereon; and an automatic fine rotation ring for rotating the laser emitter at a relatively low speed, together with the rotation ring thereon; and the automatic coarse rotation ring and the automatic fine rotation ring each having driving means arranged on the rotation ring immediately below the relevant rotation ring.

In the rotation mechanism constructed as above, it is preferred that the driving means for the automatic coarse rotation ring comprises a DC motor for allowing a high speed rotation, and the driving means for the automatic fine rotation ring comprises a stepping motor for allowing a low speed rotation.

The side wall of the casing may have window openings that are spaced from each other at an angular distance of approximately 90°, wherein the window openings are each provided with at least two sensors adapted to receive control signals for the driving means of the automatic coarse rotation ring and the driving means of the automatic fine rotation ring, the at least two sensors of each window opening being oriented in mutually different directions.

A highly accurate positioning can be achieved if the monitoring time after completion of tracking is set to at least 3 seconds.

According to the present invention, there may be arranged power transmission means between the automatic fine rotation ring and the driving means thereof, wherein the power transmission means comprises: a guide pin integral with, and projecting from an outer periphery of the automatic fine rotation ring; a guide member having catch portions engaged with the guide pin from both sides in a direction in which the automatic fine rotation ring is rotated; a screw rod for holding the guide member in a threaded engagement therewith, and adapted to be rotated by the driving means so as to cause a sliding movement of the guide member back and forth along the longitudinal axis of the screw rod; and a pair of interrupters for performing a recovery control by detecting forward and rearward sliding limits of the guide member and causing, when it has been detected that the sliding limit has been reached, the automatic fine rotation ring and the automatic coarse rotation ring to be rotated in a clockwise or counterclockwise manner whenever necessary, so as to position the laser line with a convergent point.

Effects of the Invention

The rotation mechanism for a laser emitter according to the present invention has a layered structure wherein the laser emitter is directly connected to the uppermost rotary ring in the form of a manual coarse rotation ring, and the automatic coarse rotation ring and the automatic fine rotation rings are arranged below the manual coarse rotation ring. Therefore, a manual operating force is applied only to the manual rotation rings, without being influenced by the weight of the driving system or electric power supply. In other words, the manual rotation can be performed lightly, without applying any load that may cause failure of the automatic rotation rings.

According to the present invention, furthermore, since the driving means for the automatic rotation rings are each arranged on the relevant rotation ring on the lower side, the provision of a dedicated space for the driving means is unnecessary, thereby readily realizing a compact arrangement of the rotation mechanism.

In practical application, the laser emitter should be rotated at a high speed when the laser line is situated remote from the position to be marked, whereas the laser emitter should be rotated at a low speed when the laser line is situated close to the position to be marked. However, when the driving means comprises a DC motor which is suitable for a high speed rotation, as a general matter, it is not easy to precisely stop the DC motor at a predetermined angular position. Thus, the rotation speed of the DC motor must be controlled by adjusting the PWM signal, for example, thereby requiring a complex setting and complicated structure. In contrast, when a stepping motor is used, in order to precisely stop the motor at the position to be marked, it would be inevitable to minimize the amount of angular rotation of the motor per unit step. However, when the stepping motor is rotated with a minimized amount of angular rotation, there arises a disadvantageous problem that a longer time is required to complete the positioning of the laser line. When, as in a preferred embodiment of the present invention, a DC motor and a stepping motor are used in combination, a precise positioning of the laser line at the position to be marked can be performed within a short time, by the DC motor for the coarse adjustment and the stepping motor for the stepping motor.

When the laser line is positioned to the center (i.e., the convergent point) of the light receiving sensor of the receiver by driving the automatic fine rotation ring by means of the stepping motor, because the stepping motor drives the automatic fine rotation ring in a stepwise manner with a predetermined stepping angle, there may be instances wherein the laser line passes over the convergent point. In such a case, because the laser line is continuously rotated in a direction away from the convergent point, the positioning cannot be performed quickly. Such a potential problem can be eliminated by a preferred embodiment of the present invention, wherein power transmission means is arranged between the automatic fine rotation ring and the driving means thereof, and provided with interrupters which performs a recovery control by detecting the sliding limits of a guide member for controlling the rotation of the automatic fine rotation ring and causing, when it has been detected that the sliding limit has been reached, the automatic fine rotation ring and the automatic coarse rotation ring to be repeatedly rotated in a clockwise or counterclockwise manner whenever necessary, so as to position the laser line with a convergent point.

BRIEF DESCRIPTION OF THE DRAWINGS

The present invention will be described below in further detail, with reference to the accompanying drawings, wherein.

BEST MODE FOR CARRYING OUT THE INVENTION

Figure 1:
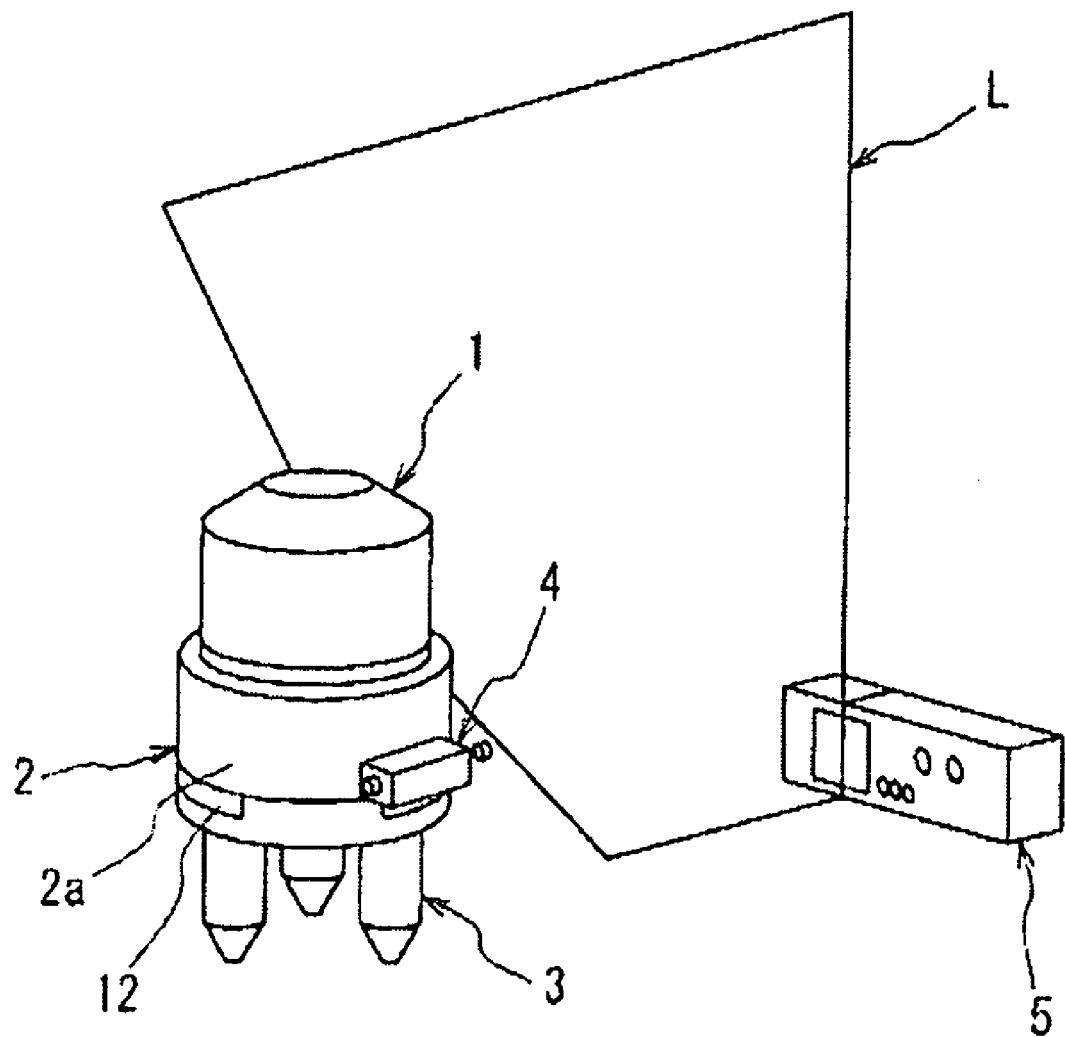
FIG. 1 shows the arrangement of a laser emitter and a receiver, wherein the laser emitter is equipped with the rotation mechanism according to the present invention.

With reference to FIG. 1, there is shown the arrangement of an automatic tracking-type laser emitter and a receiver for receiving a laser line (e.g., a vertical line, as in the illustrated embodiment) which is generated by the emitter, wherein the laser emitter is equipped with the rotation mechanism according to the present invention. The exploded perspective view of the rotation mechanism is shown in FIG. 2.

In the drawings, reference numeral 1 denotes the laser emitter, reference numeral 2 denotes a rotation mechanism for rotatably supporting the laser emitter 1, reference numeral 3 denotes a tripod provided at the bottom portion of a casing 2*a* of the rotation mechanism 2, reference numeral 4 denotes a knob portion for causing a coarse rotation of a manual coarse rotation ring of the rotation mechanism, and reference numeral 5 denotes a receiver (light receiving unit) for receiving the laser generated by the laser emitter 1.

Figure 2:
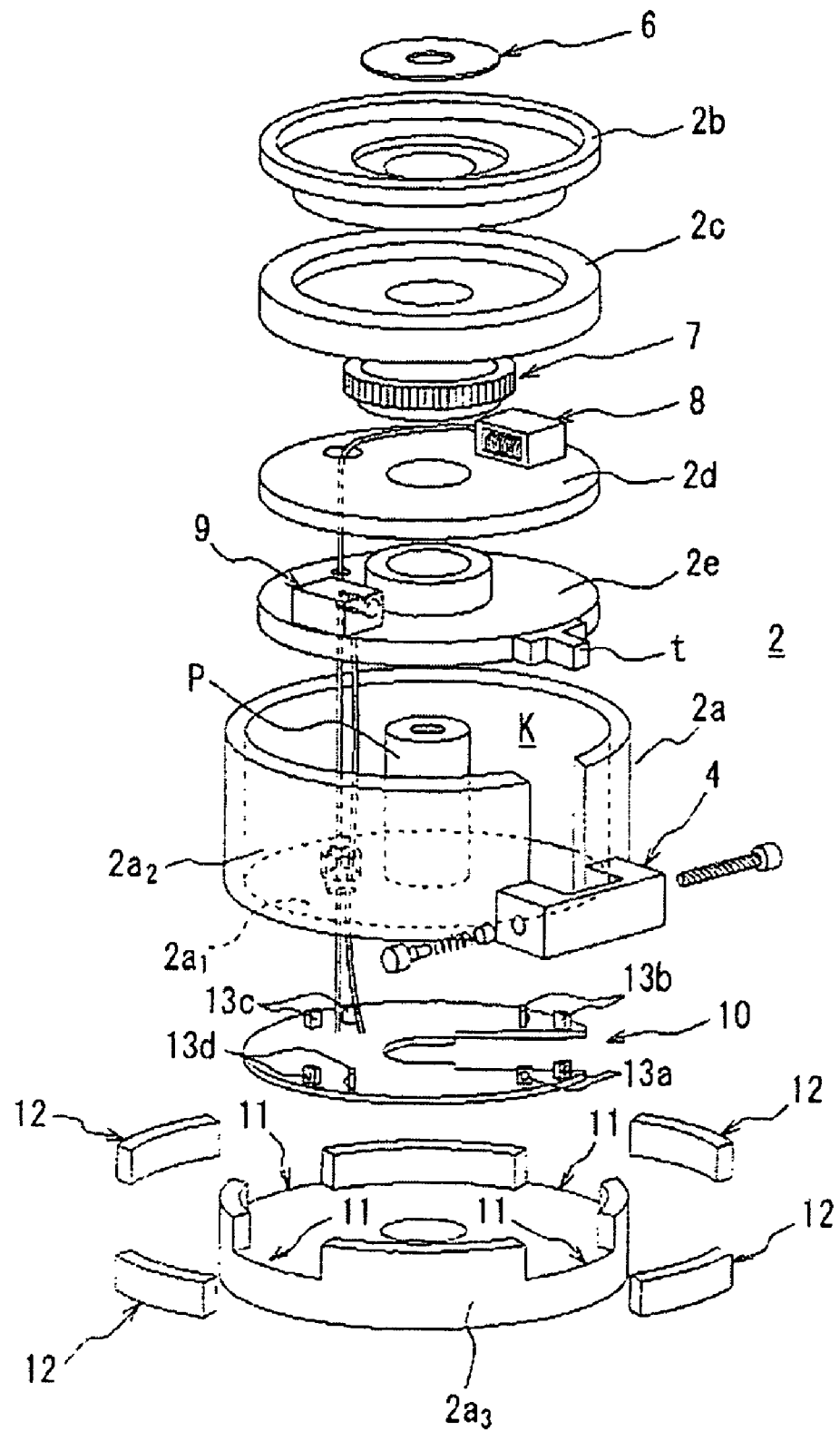
FIG. 2 is an exploded perspective view of the rotation mechanism.

The casing 2*a* of the rotation mechanism 2 includes, as shown in FIG. 2, the bottom portion 2*a*$_1$, a side wall 2*a*$_2$ connected to the bottom portion 2*a*$_1$, and a bottom cover 2*a*$_3$, and defines a receiving space K therein.

Within the receiving space K, there are sequentially arranged in a layered manner, as seen from the upper side, a manual coarse rotation ring 2*b* directly connected to the laser emitter 1 for supporting the laser emitter 1 and manually rotating it to achieve a coarse positioning, an automatic coarse rotation ring 2*c* for rotating the laser emitter at a relatively high speed, an automatic fine rotation ring 2*d* for rotating the laser emitter 1 at a relatively low speed to achieve a fine positioning, and a manual fine rotation ring 2*e* for manually rotating the laser emitter 1 to achieve a fine positioning. These rotation rings are rotatable about a shaft p that is integrally provided on the bottom portion 2*a*$_1$ of the casing 2*a*.

Reference numeral 6 denotes a fitting for securing the laser emitter 1 to the manual coarse rotation ring 2*b* and preventing withdrawal thereof, reference numeral 7 denotes a helical gear connected to the automatic coarse rotation ring 2*c*, and reference numeral 8 denotes a DC motor unit including a reduction gear mechanism, for driving the automatic coarse rotation ring 2*c* into rotation, through the helical gear 7. The DC motor unit 8 is designed to have a reduction ratio suitable for coarsely driving the automatic coarse rotation ring 2*c* at a high speed, and fixedly arranged on the automatic fine rotation ring 2*d* that is situated immediately below the automatic coarse rotation ring 2*c*.

Reference numeral 9 denotes a stepping motor unit including a power transmission mechanism, for driving the manual fine rotation ring 2c into rotation. The stepping motor unit 9 is designed to precisely rotate the automatic fine rotation ring 2d, and fixedly arranged on the manual fine rotation ring 2e that is situated immediately below the automatic fine rotation ring 2d.

Reference numeral 10 denotes a circuit board arranged inside of the bottom cover $2a_3$ and incorporating a driver circuit for driving the rotation mechanism 2 so as to rotate the laser emitter 1, reference numeral 11 denotes notches formed in the bottom cover 2a3 at an angular interval of 90° to define window openings, reference numeral 12 denotes filters for shielding the respective notches 11, and reference numerals 13a to 13d denotes sensors arranged on the circuit board 10 and directed toward outside through the filters 12 in the notches 11. These sensors 13a to 13d constitute a signal reception means for receiving signals transmitted from the receiver 5 so that, in response to the received signals, the DC motor unit 8 or the stepping motor unit 9 is operated to rotate the automatic coarse rotation ring 2c or the automatic fine rotation ring 2d, thereby to move the laser line to a desired location.

In the arrangement shown in FIG. 1, the laser emitter 1 is illustrated as generating a single vertical laser line L. However, the laser emitter 1 may be designed so as to generate a plurality of laser lines or a laser beam for marking a floor surface. The laser emitter 1 is used in combination with the receiver 5 for receiving the laser line generated from the laser emitter 1.

Figure 3:
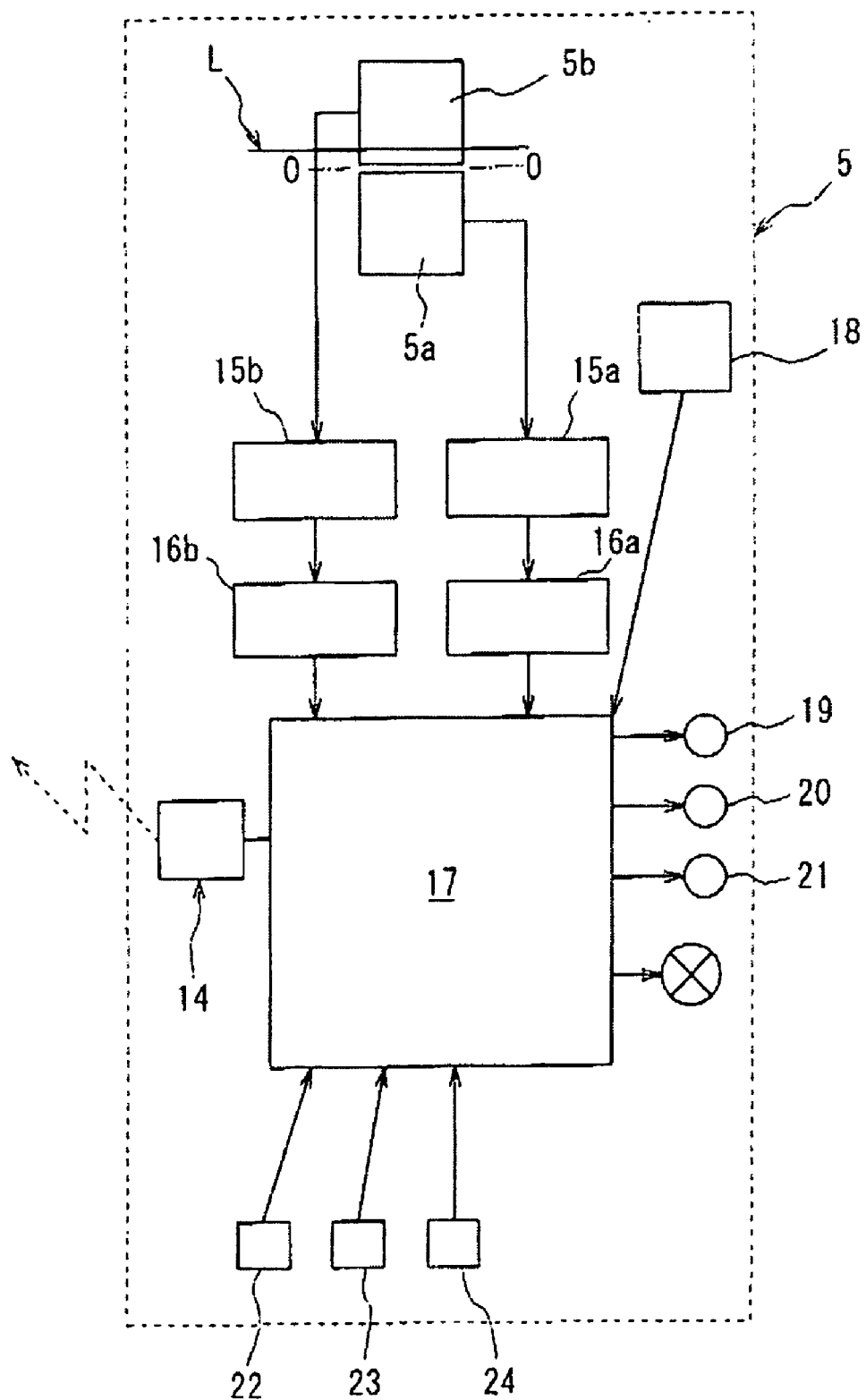
FIG. 3 is a diagram showing the structure of the receiver.

In the embodiment of the receiver 5 as shown in FIG. 3, the light receiving sensor portion is formed by light receiving elements 5a, 5b which are arranged on the left and right sides. The laser emitter 1 is rotated by the rotation mechanism 2 and thereby adjusted or positioned such that the laser line L coincides with the center portion O (convergent point) of the light receiving sensor portion. Depending upon the situation, there may be instances wherein the position of the receiver itself is changed.

When the laser line L emitted toward the light receiving sensor portion of the receiver 5 is incident on the sensor 5a on the right side, the transmitter 14 of the receiver 5 transmits a command signal to the signal reception means of the rotation mechanism 2 so that the laser line is moved toward left and positioned to the center portion O of the light receiving sensor portion. On the contrary, when the laser line L emitted toward the light receiving sensor portion of the receiver 5 is incident on the sensor 5b on the left side, the transmitter 14 of the receiver 5 transmits a command signal to the signal reception means of the rotation mechanism 2 so that the laser line is moved toward right and positioned to the center portion O of the light receiving sensor portion.

The optical signals obtained by the sensors 5a, 5b are subjected to filtration by filter amplifiers 15a, 15b to have a required frequency band only, signal conversion by rectifiers 16a, 16b, and signal processing and by a microcomputer 17. On this occasion, the output signal of an acceleration sensor 18 is also supplied to the microcomputer 18 to provide current position information, based on which the sequence of the signals from the sensors 5a, 5b are changed or returned.

The receiver 5 includes LEDs 19, 20, 21 and acoustic buzzer, etc, for displaying the status of light reception, and other switches 22 to 24.

Figure 4:
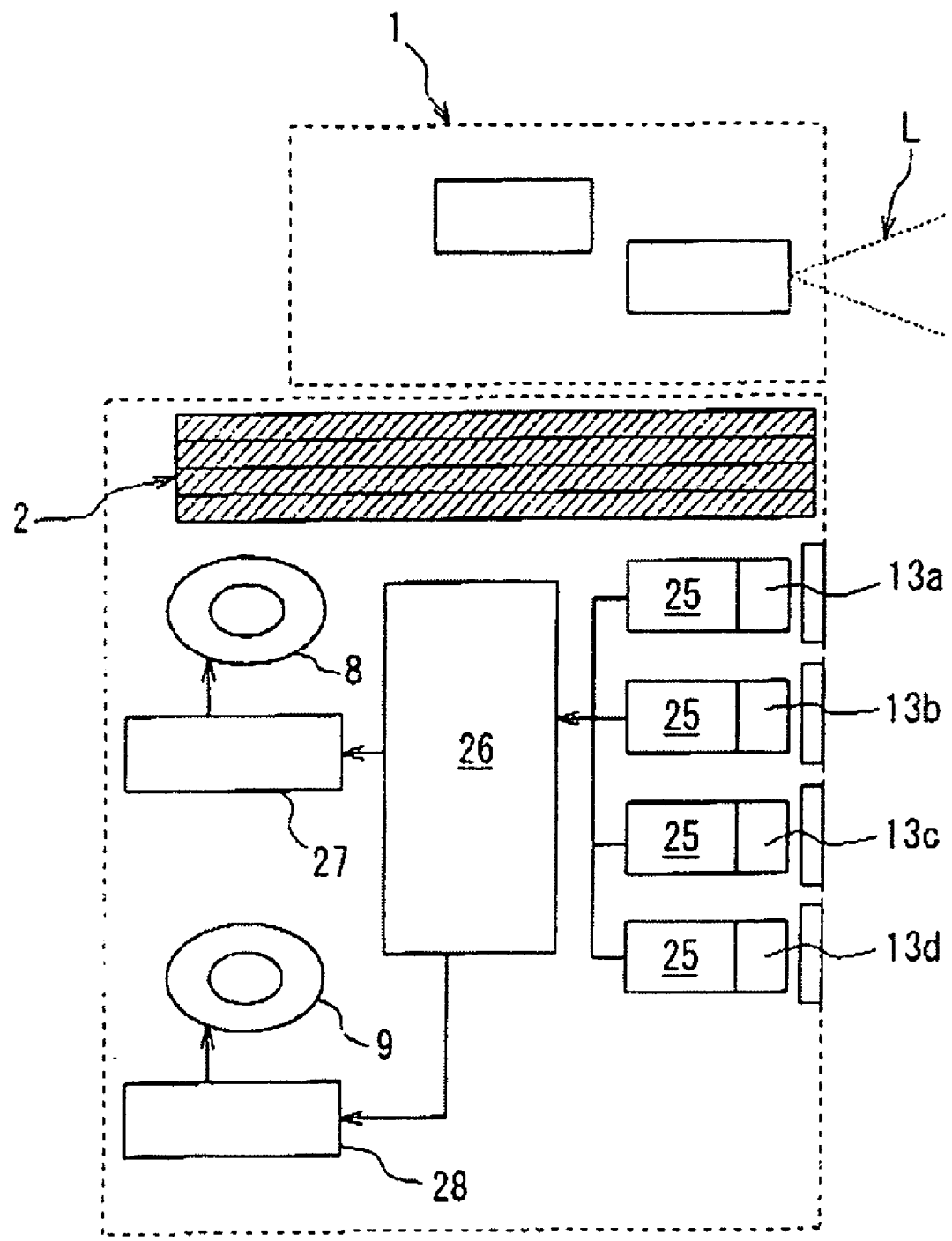
FIG. 4 is a block diagram of the rotation mechanism.

One embodiment of the rotation mechanism according to the present invention is shown in FIG. 4, wherein the signals transmitted from the transmitter 14 of the receiver 5 are received by the sensors 13a to 13d of the rotation mechanism 2 and supplied, through an optoelectronic conversion circuit 25, to a microcomputer 26 for signal processing so as to operate driver circuits 27, 28 to drive the DC motor unit 8 and the stepping motor unit 9 and thereby rotate the automatic coarse rotation ring 2c or automatic fine rotation ring 2d. if necessary.

Figure 5:
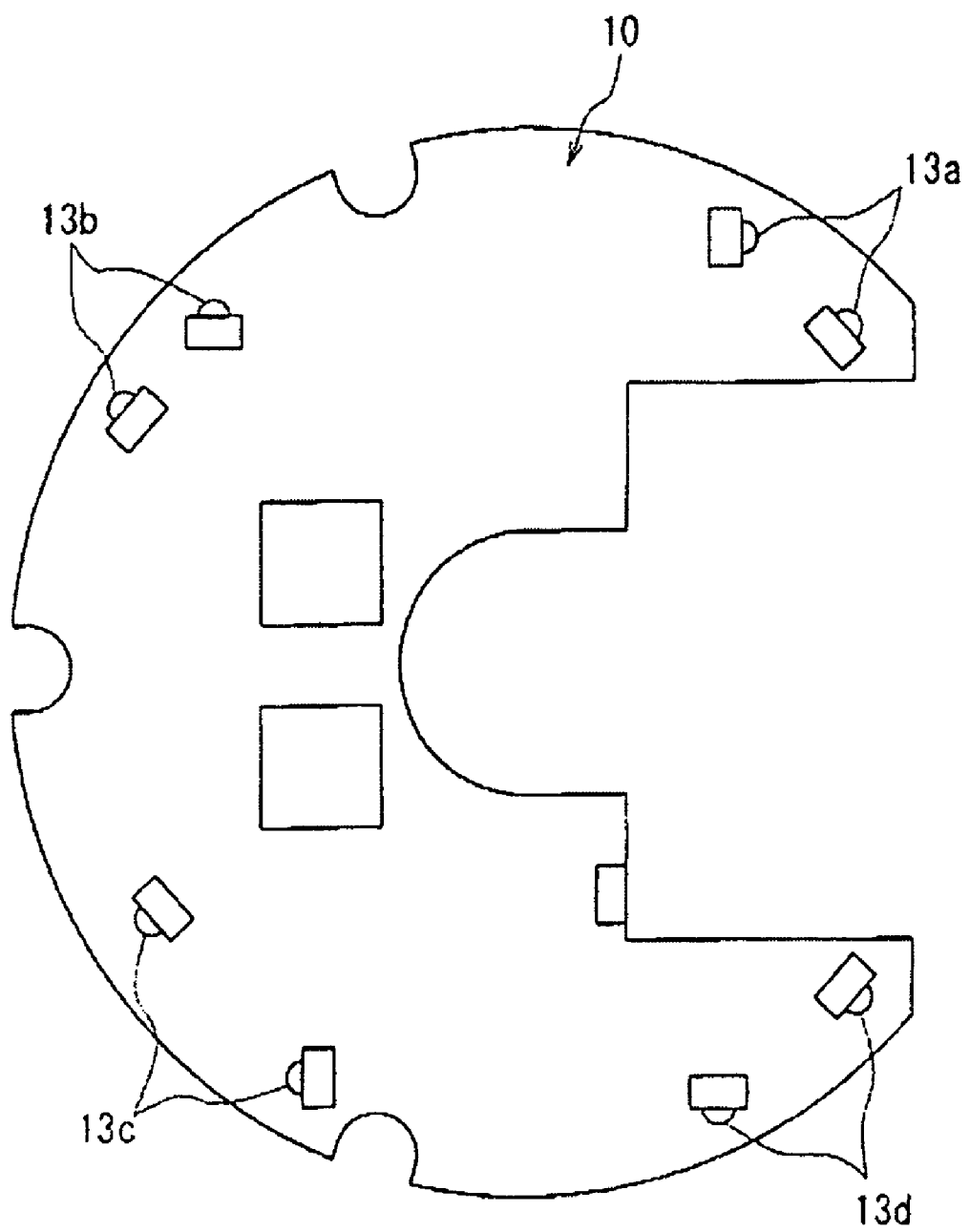
FIG. 5 is a plan view showing the arrangement of the sensors.
Figure 6:
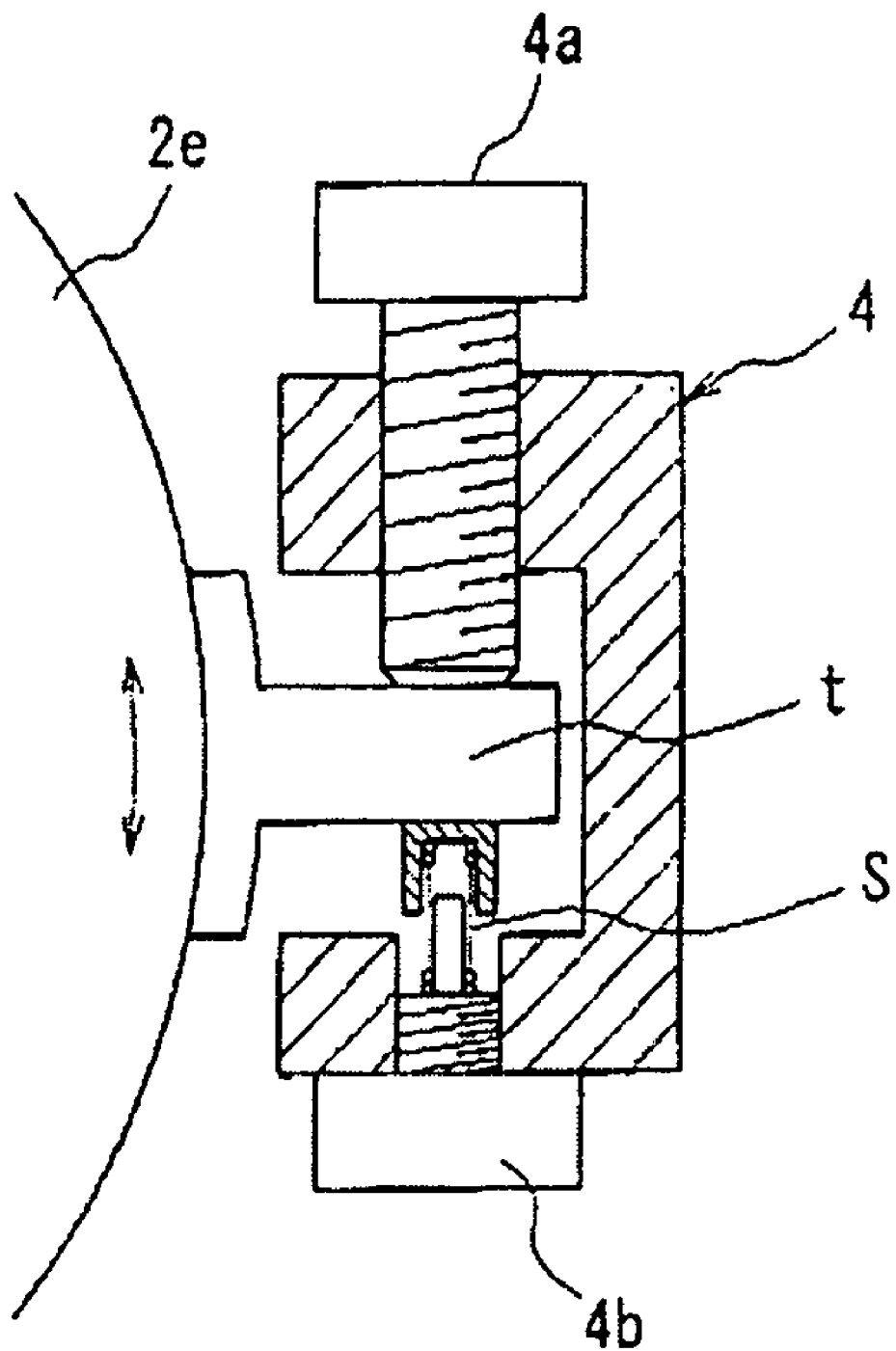
FIG. 6 is a detailed view of a knob portion.

FIG. 5 is a plan view showing the arrangement of the sensors 13a to 13d, and FIG. 6 is a detailed view of the knob portion 4 for causing a fine movement of the manual fine rotation ring 2e.

When the sensors 13a to 15d are arranged as shown in FIG. 5, it is possible to positively receive the signals from the receiver 5. However, the present invention is not limited to such a specific arrangement, and it is possible to adopt various types of arrangement.

One example of the structure of the knob portion 4 is as follows. As shown in FIG. 6, the manual fine rotation ring 2f is provided with a projection t, which is clamped from both sides between screw rods 4a, 4b. One of these screw rods, i.e., the screw rod 4b, is illustrated as having a tip end portion that is resiliently biased by a spring s. It is possible to cause a fine movement of the manual fine rotation ring 2e, by suitably rotating the screw rod 4a in a clockwise or counterclockwise manner. A similar mechanism can be applied also to the automatic fine rotation ring 2d, except the motor and the gears of the power transmission system. However, the present invention is not limited to such a specific arrangement of the knob portion 4.

Figure 7:
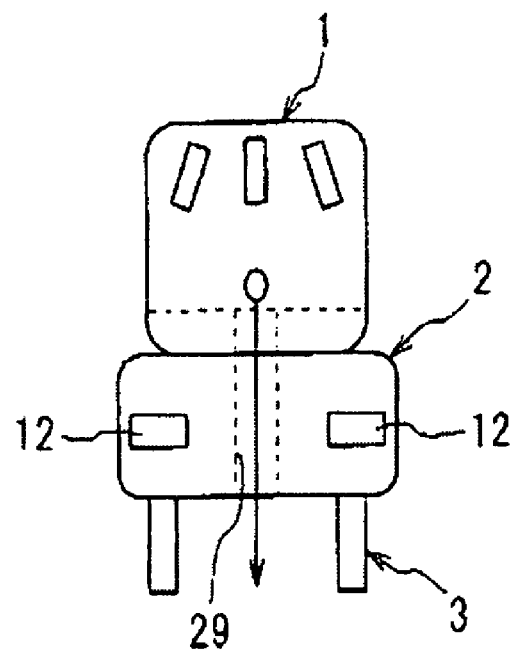
FIG. 7 is a schematic view showing the arrangement of an emitter for emitting a laser line for marking a floor surface.

In the laser emitter capable of generating a laser beam spot for marking a floor surface, as schematically shown in FIG. 7, the shaft p of the rotation mechanism 2 has a bore 29 extending therethrough, so as to allow the passage of the laser beam for marking the floor surface.

Figure 8:
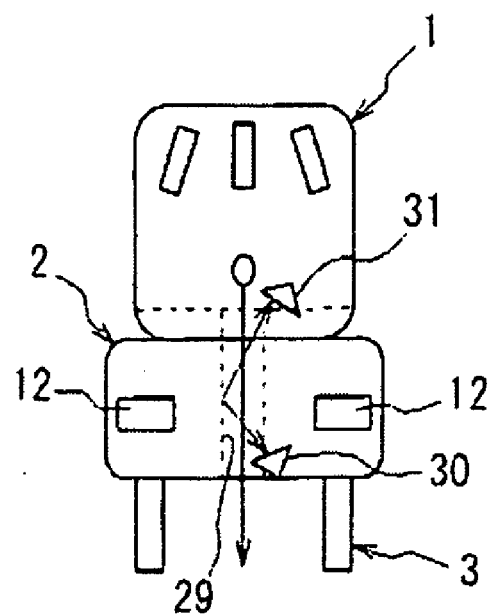
FIG. 8 is a schematic view showing the operation of the emitter of FIG. 7.

In such a structure of the laser emitter 1, as schematically shown in FIG. 8, there may be provided within the rotation mechanism 2, an infrared signal transmission portion 30 adjacent to the bore 29, and an infrared signal reception portion 30 at the exit opening of the laser emitter 1. In this instance, the signal obtained through the filter 12 of the rotation mechanism 2 is transmitted from the transmission portion 30 toward the laser emitter 1, i.e., toward the reception portion 31 while reflecting inside or the bore 29, so as to control the mode of laser generation (e.g., generation of a vertical line, a horizontal line, a vertical center line, a vertical 90° line, etc.), and to effect ON/OFF control of the electric power supply.

Figure 9:
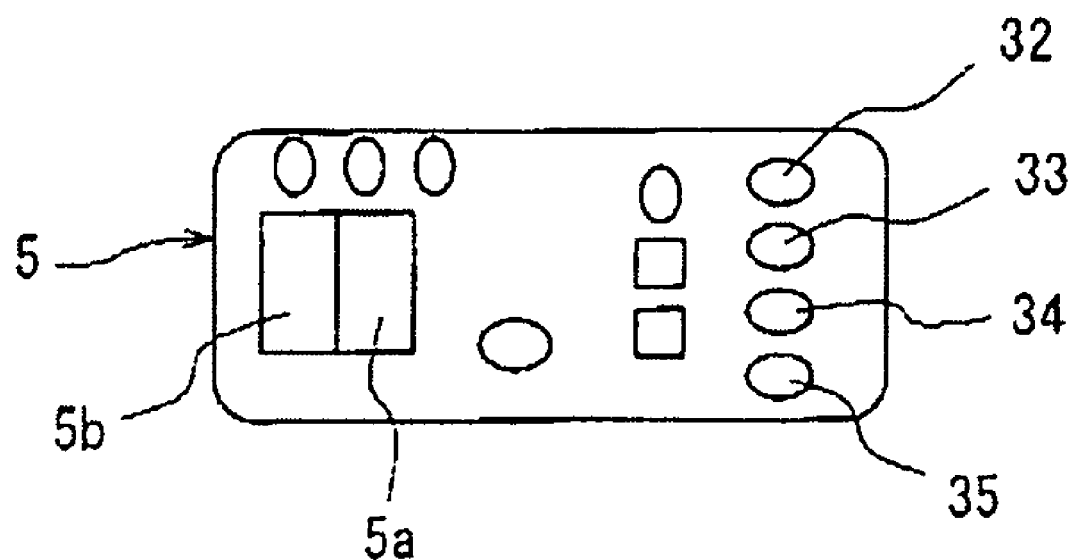
FIG. 9 is a schematic view showing another example of the receiver.

One example of the receiver 5 is shown in FIG. 9, which may be suitably used in combination with the laser emitter having the abovementioned structure.

In the receiver as shown in FIG. 9, key switches 32, 33, 34, 35 are used to perform a remote control of the laser emitter 1. Thus, for example, the key switch 32 is assigned to the generation of a vertical line, the key switch 33 is assigned to the generation of a horizontal line, the key switch 34 is assigned to the generation of vertical and horizontal lines, and the key switch 35 is assigned to the ON/OFF control of the electric power supply.

The rotation mechanism 2 has a structure that is basically the same as that shown in FIG. 4, except the additional provision of the laser beam emission for marking the floor surface.

Although infrared ray is suitably used as the communication signal for driving the rotation mechanism 2, there may be used an electromagnetic-type communication signal. The signals to be transmitted and received between the rotation mechanism 2 and the laser emitter 1 mat be infrared ray or electromagnetic signal.

The signals for performing a remote control of the driving means for the automatic coarse rotation ring 2c and automatic fine rotation ring 2e of the rotation mechanism 2, i.e., the DC motor unit 8 and the stepping motor unit 9, are received by the sensors 13a to 13d. Therefore, an ideal arrangement is that the window openings are provided on the entire periphery of the rotation mechanism 2 so that the sensors are circumferentially arranged as tightly as possible, though such an arrangement results in degraded mechanical strength of the casing. In view of such a potential problem, according to a preferred embodiment of the present invention, the side wall of the casing 2a in its lower region has window openings that are spaced from each other at all angular distance of approximately 90°. In this instance, as shown in FIG. 5, the window openings are each provided with at least two sensors which are oriented in mutually different directions. In this way, the signal reception sensitivity can be improved without degrading the mechanical strength of the casing 2a.

When the rotation of the laser emitter by the rotation mechanism is stopped, particularly in the case of a sensor-type laser emitter, there may be instances wherein the degree of horizontal or vertical alignment of the laser line is still being controlled. Therefor, in consideration of such a situation, it is preferred that the operation of the rotation mechanism is stopped with a time lag of at least 3 seconds after the rotation of the laser emitter has been stopped, so as to realize a precise positioning.

Figure 10:
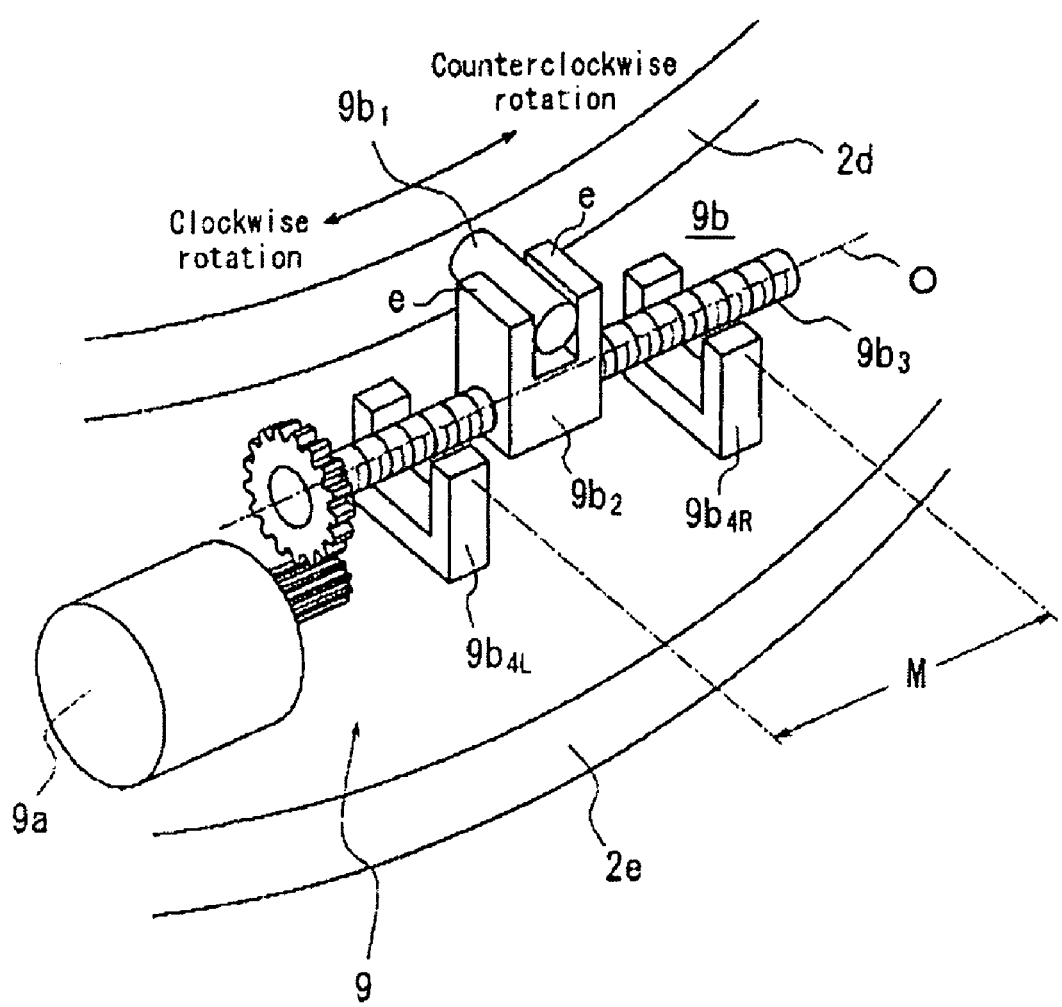
FIG. 10 is a perspective view showing the detail of the stepping motor unit in the rotation mechanism according to the present invention.

FIG. 10 is a perspective view showing the detail of the stepping motor unit 9 in the rotation mechanism according to the present invention, wherein reference numeral 9a denotes a stepping motor, and reference numeral 9b denotes a power transmission mechanism.

the power transmission mechanism 9b includes a guide pin $9b_1$ integral with, and projecting from the outer periphery of the automatic fine rotation ring 2d, a guide member $9b_2$ having catch portions c engaged with the guide pin $9b_1$ from both sides in a direction indicated by the double arrow, in which the automatic fine rotation ring 2d is rotated, a screw rod $9b_3$ rotatably supported by bearings (not shown) for holding the guide member $9b_2$ in a threaded engagement therewith, and adapted to be rotated by the stepping motor 9a to cause a sliding movement of the guide member back and forth along the longitudinal axis of the screw rod $9b_3$, and a pair of interrupters $9b_{4R}$, $9b_{4L}$ which are provided for the screw rod $9b_3$ as being spaced from each other by a distance M so as to sandwich the guide member $9b_2$. Thus, the distance M between the interrupters defines a slidable range of the guide member $9b_2$.

When the stepping motor 9a is driven to rotate the screw rod $9b_3$, the guide member $9b_2$ is caused to slide along the longitudinal axis O of the screw rod $9b_3$. Thus, the automatic fine rotation ring 2d undergoes a fine movement in a clockwise or counterclockwise direction. In this connection, it is preferred that the range of the fine movement of the ring 2d is set to the angular range of approximately ±3° (or the distance of ±2 mm.

In the illustrated embodiment, when the automatic fine rotation ring 2d is caused to undergo a counterclockwise fine movement, the guide member $9b_2$ slides toward the interrupter $9b_{4R}$. As soon as the guide member $9b_2$ is detected by the interrupter $9b_{4R}$, a signal is generated which indicates that the sliding limit in the this direction has been reached.

On the other hand, when the automatic fine rotation ring 2d is caused to undergo a clockwise fine movement, the guide member $9b_2$ slides toward the interrupter $9b_{4L}$. As soon as the guide member $9b_2$ is detected by the interrupter $9b_{4L}$, a signal is generated which indicates that the sliding limit in this direction has been reached.

In the rotation mechanism including the power transmission mechanism 9b of the structure as explained above, during the course of positioning wherein the laser line L is to be aligned with the convergent point of the light reception sensor portion of the receiver 5 by rotating the automatic fine rotation ring 2d in a clockwise manner, for example, a recovery control is performed when the laser line L has passed the convergent point of the light reception sensor portion. In this connection, it is assumed that there definitely exists a particular location within the sliding range M of the guide member $9b_2$, where the laser line L coincides with the convergent point of the light reception sensor portion of the receiver 5.

First of all, when the laser line L passes over the convergent point and the guide member $9b_2$ continues to slide toward the interrupter $9b_{4L}$ and is detected thereby, a signal is generated to indicate that the guide member $9b_2$ has reached its sliding limit.

Then, the stepping motor 9a is driven in the reverse direction to cause a counterclockwise rotation of the automatic fine rotation ring 2d by an angular amount of 3° (corresponding to the center of the distance M). The DC motor 8a is also driven to cause a clockwise rotation of the rotation ring 2c by an angular amount of 6°. Then, a counterclockwise rotation of the automatic fine rotation ring 2d is caused by the stepping motor 9a so that the laser line L comes into alignment with the convergent point.

In the process of the abovementioned repositioning, if the laser line passes over the convergent point without being aligned therewith, the guide member $9b_2$ continues to slide toward the interrupter $9b_{4R}$ and is detected thereby, so that a signal is generated to indicate that the guide member $9b_2$ has reached its sliding limit. Based on this signal, the stepping motor 9a is driven in the reverse direction to cause a clockwise rotation of the automatic fine rotation ring 2d by an angular amount of 3° (corresponding to the center of the distance M). The DC motor 8a is also driven to cause a counterclockwise rotation of the rotation ring 2c by an angular amount of 6°. Then, a clockwise rotation of the automatic fine rotation ring 2d is caused by the stepping motor 9a so that the laser line L comes into alignment with the convergent point.

Figure 11:
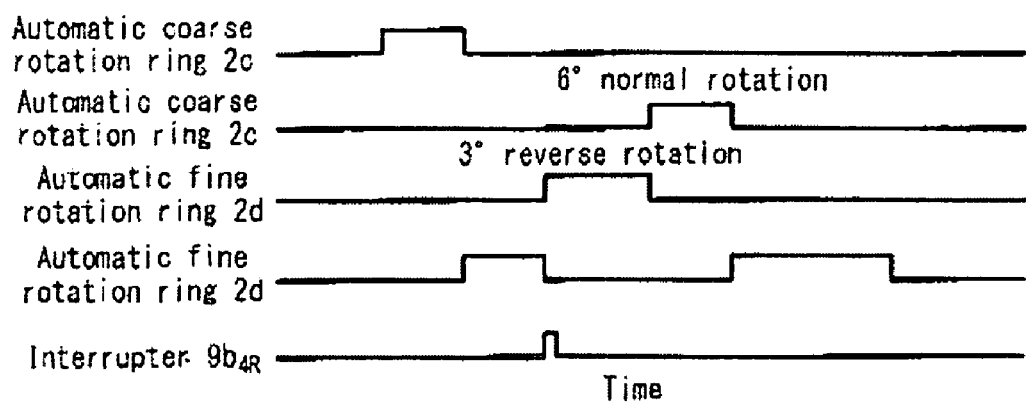
FIGS. 11(*a*) and 11(*b*) are time charts showing the rotation of the automatic coarse rotation ring and the automatic fine rotation ring, respectively.
Figure 11:
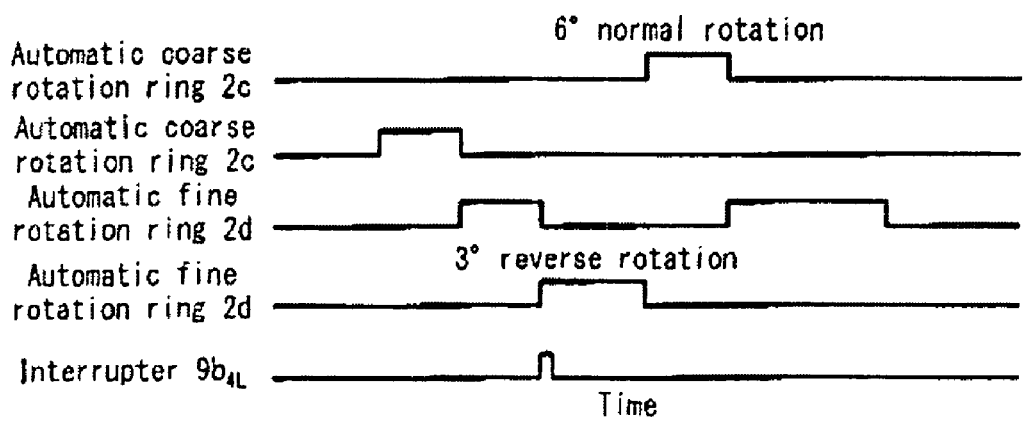

In the rotation mechanism wherein an automatic tracking control is performed as explained above, a similar recovery control is repeatedly performed for the automatic coarse rotation ring 2c and the automatic fine rotation ring 2e until the laser line L is aligned with the convergent point. When the guide member $9b_2$ is detected by the interrupters $9b_{4R}$, $9b_{4L}$, the automatic coarse rotation ring 2c and the automatic fine rotation ring 2e are operated in accordance with the time charts as shown in FIGS. 11(a) and 11(b).

In connection with the abovementioned recovery control, the position of the guide member $9b_2$ is set substantially to the center of the distance M by the initial operation performed when the electric power supply of the rotation mechanism is switched ON. However, the center position of the guide member $9b_2$ is gradually shifted alter the tracking control has been performed for the positioning many times. The recovery control serves effectively to compensate for such a shifting.

It has been explained above that, upon the recovery control, the angular range of rotation of the automatic fine rotation ring 2d is set to ±3° so that this ring is caused to rotate in the reverse direction by an amount of approximately 3° (i.e., ten thousands steps of the stepping motor 9a). However, the present invention is not limited to such a specific example, and the angular range may be set to another suitable range.

It has also been explained above that, upon the recovery control, the automatic coarse rotation ring 2c is rotated by an angle of 6°, though the present invention is not limited to such a specific angular range. The rotation angle of 6° corresponds to the operation time of the DC motor for approximately 0.33 sec. By causing the automatic fine rotation ring $2d$ to rotate in the reverse direction, and subsequently causing the automatic coarse rotation ring $2c$ to rotate in the direction opposite to the automatic fine rotation ring $2d$, it is possible to resume the initial state of the laser line positioning.

Figure 12:
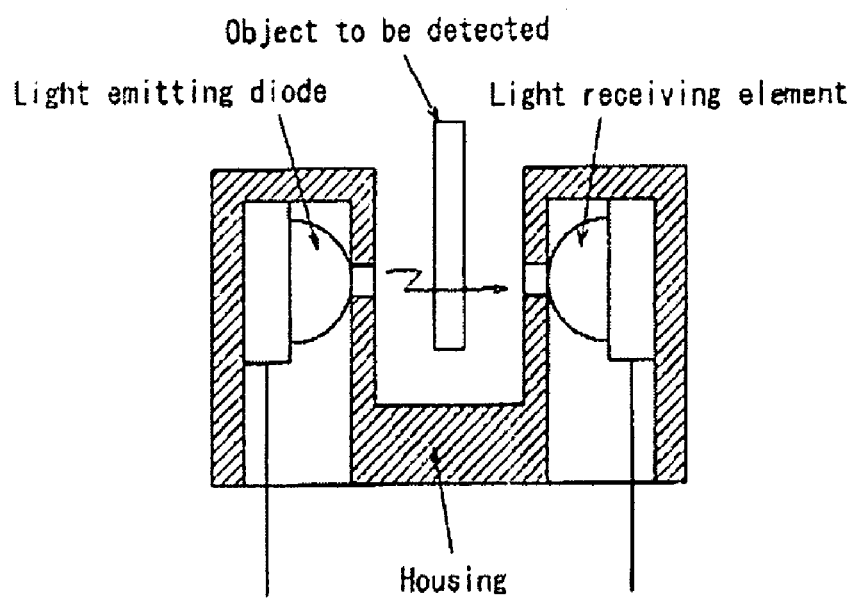
FIG. 12 is a schematic view showing one example of the interrupters.

FIG. 12 is a schematic view showing the detail of the interrupters $9b_{4R}$, $9b_{4L}$. These interrupters $9b_{4R}$, $9b_{4L}$ are transmission-type photo-interrupters wherein a light emitting diode and a light receiving element are arranged opposite to each other in the housing, for performing a non-contact detection of the change in light intensity on the side of the light receiving element, which arises from an object passing therethrough, in order to detect the sliding limit of the guide member $9b_2$.

Figure 13:
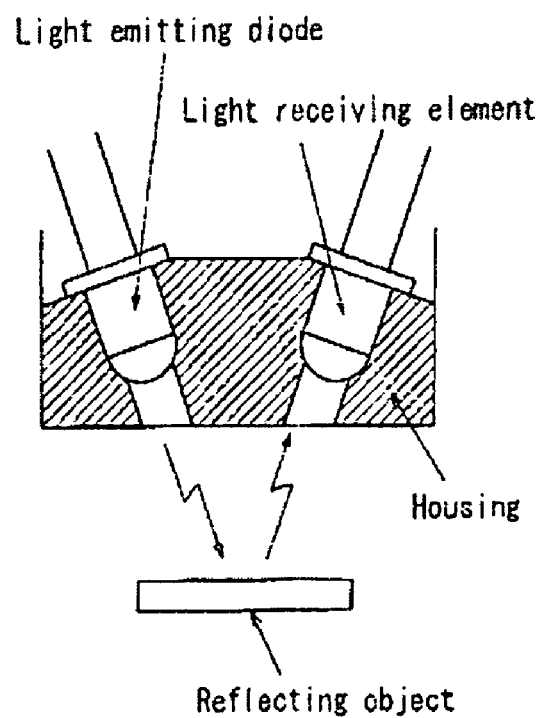
FIG. 13 is a schematic view showing another example of the interrupters.

According to the present invention, instead of the interrupters as shown in FIG. 12, there may be used a reflection-type interrupters such as that shown in FIG. 13. There is no particular limitation to the type of the interrupters.

INDUSTRIAL APPLICABILITY

According to the present invention, there is provided a rotation mechanism, which allows a rapid and accurate focusing of the laser line emitted from the laser emitter, and which is compact in structure.

The invention claimed is:

1. A rotation mechanism for mounting and rotatably supporting a laser emitter thereon, said rotary mechanism comprising:
   a casing including a bottom wall and a side wall connected to the bottom wall, said casing defining therein a receiving space; and
   a plurality of rotation rings that are arranged layered with each other in the receiving space of the casing;
   said plurality of rotation rings comprising:
      an uppermost rotation ring in the form of a manual coarse rotation ring that is directly connected to the laser emitter so as to support the laser emitter, the manual coarse rotation ring operable to manually rotating the laser emitter to achieve a coarse angular positioning thereof;
      an automatic coarse rotation ring operable to rotate the laser emitter at a relatively high speed together with another of the plurality of rotation rings which is layered immediately above the automatic coarse rotation ring, the automatic coarse rotation ring having a first driving means arranged on another of the plurality of rotation rings which is layered immediately below the automatic coarse rotation ring;
      a manual fine rotation ring operable to slightly rotate the laser emitter manually together with another of the plurality of rotation rings which is layered immediately above the manual fine rotation ring; and
      an automatic fine rotation ring for rotating the laser emitter at a relatively low speed, together with another of the plurality of rotation rings which is layered immediately above the automatic fine rotation ring, the automatic fine rotation ring having a second driving means arranged on another of the plurality of rotation rings which is layered immediately below the automatic fine rotation ring;
   wherein the manual coarse rotation ring, the automatic coarse rotation ring, the manual fine rotation ring, and the automatic fine rotation ring are coaxially disposed in the receiving space defined by the casing.

2. The rotation mechanism according to claim 1, wherein the driving means for the automatic coarse rotation ring comprises a DC motor for allowing a high speed rotation, and the driving means for the automatic fine rotation ring comprises a stepping motor for allowing a low speed rotation.

3. The rotation mechanism according to claim 1, wherein the side wall of the casing has window openings that are spaced from each other at an angular distance of approximately 90°, and wherein the window openings are each provided with at least two sensors adapted to receive control signals for the driving means of the automatic coarse rotation ring and the driving means of the automatic fine rotation ring, the at least two sensors of each window opening being oriented in mutually different directions.

4. The rotation mechanism according to claim 1, further comprising monitoring means for completing an operation of the rotation mechanism with a time lag of at least three seconds after a positioning of the laser line has been completed.

5. The rotation mechanism according to claim 1, further comprising power transmission means arranged between the automatic fine rotation ring and the driving means thereof, the power transmission means comprising:
   a guide pin integral with, and projecting from an outer periphery of the automatic fine rotation ring;
   a guide member having catch portions engaged with the guide pin from both sides in a direction in which the automatic fine rotation ring is rotated;
   a screw rod holding the guide member, the screw rod threadably engaged with the guide member and adapted to be rotated by the driving means so as to cause a sliding movement of the guide member back and forth along the longitudinal axis of the screw rod; and
   a pair of interrupters positioned at limits of the sliding movement of the guide member back and forth along the longitudinal axis of the screw rod, the pair of interrupters operable to perform a recovery control by detecting forward and rearward sliding limits of the guide member and causing, when it has been detected that the sliding limit has been reached, the automatic fine rotation ring and the automatic coarse rotation ring to be rotated in a clockwise or counterclockwise manner whenever necessary, so as to position the laser line with a convergent point.

6. The rotation mechanism according to claim 1, a shaft extending through the manual coarse rotation ring, through the automatic coarse rotation ring, through the manual fine rotation ring, and through the automatic fine rotation ring.

7. The rotation mechanism according to claim 6, wherein the shaft integral with the bottom wall of the casing.

8. The rotation mechanism according to claim 1, wherein the plurality of rotation rings are layered with the automatic coarse rotation ring underlying the manual coarse rotation ring, with the automatic fine rotation ring underlying the automatic coarse rotation ring, and the manual fine rotation ring underlying the automatic fine rotation ring.

9. A rotation mechanism for mounting and rotatably supporting a laser emitter thereon, said rotary mechanism comprising:
   a casing including a bottom wall and a side wall connected to the bottom wall, said casing defining therein a receiving space; and
   a plurality of rotation rings that are arranged layered with each other in the receiving space of the casing, the plurality of rotation rings comprising:
      a manual coarse rotation ring directly connected to the laser emitter so as to support the laser emitter, positioned uppermost of the plurality of rotation rings, and manually operable to rotate the laser emitter to achieve a coarse angular positioning of the laser emitter;

an automatic coarse rotation ring layered immediately below the manual coarse rotation ring such that rotation of the automatic coarse rotation ring rotates rotate the laser emitter together with the manual coarse rotation ring;

an automatic fine rotation ring layered immediately below the automatic coarse rotation ring such that rotation of the automatic fine rotation ring rotates the laser emitter together with the manual coarse rotation ring and the automatic coarse rotation ring; and a manual fine rotation ring layered immediately below the automatic fine rotation ring and manually operable to slightly rotate the laser emitter together with the manual coarse rotation ring, the automatic coarse rotation ring, and the automatic fine rotation ring;

a first driving means positioned on the automatic fine rotation ring, the first driving means operable to rotate the automatic coarse rotation ring; and a second driving means positioned on the manual fine rotation ring, the second driving means operable to rotate the automatic fine rotation ring;

wherein the manual coarse rotation ring, the automatic coarse rotation ring, the manual fine rotation ring, and the automatic fine rotation ring are coaxially disposed in the receiving space defined by the casing.

\* \* \* \* \*

UNITED STATES PATENT AND TRADEMARK OFFICE
CERTIFICATE OF CORRECTION

| | | |
|---|---|---|
| PATENT NO. | : 8,272,616 B2 | Page 1 of 1 |
| APPLICATION NO. | : 12/375947 | |
| DATED | : September 25, 2012 | |
| INVENTOR(S) | : Kazuo Sato et al. | |

It is certified that error appears in the above-identified patent and that said Letters Patent is hereby corrected as shown below:

Column 11,
Line 6, after "rotates" delete "rotate"

Signed and Sealed this
Fourth Day of December, 2012

David J. Kappos
*Director of the United States Patent and Trademark Office*